United States Patent  (10) Patent No.: US 6,238,197 B1
Van Hout et al.  (45) Date of Patent: May 29, 2001

(54) INJECTION MOULD (75) Inventors: Petrus Johannes Frederik Joseph Van Hout, Helmond; Martinus Henricus Joseph Voets, Eindhoven, both of (NL); Jozef Smeets, Antwerp (BE)

(73) Assignee: Axxicon Moulds Eindhoven B.V., Son (NL)

( * ) Notice: Subject to any disclaimer, the term of this patent is extended or adjusted under 35 U.S.C. 154(b) by 0 days.

(21) Appl. No.: 09/319,330

(22) PCT Filed: Jan. 25, 1999

(86) PCT No.: PCT/NL99/00044

§ 371 Date: Feb. 7, 2000

§ 102(e) Date: Feb. 7, 2000

(87) PCT Pub. No.: WO99/37471

PCT Pub. Date: Jul. 29, 1999

(30) Foreign Application Priority Data

Jan. 23, 1998 (NL) ..................................... 1008105

(51) Int. Cl.⁷ .......................... B29D 17/00; B29C 45/37; B29C 45/26
(52) U.S. Cl. ......................... 425/168; 425/810; 65/374.15
(58) Field of Search ................................... 425/470, 542, 425/810, 168; 249/114.1, 115; 264/1.33, 1.9, 106, 107, 338; 65/374.15

(56) References Cited

U.S. PATENT DOCUMENTS

| | | | |
|---|---|---|---|
| 3,793,195 | * 2/1974 | Betts .................................... | 428/469 |
| 4,783,041 | * 11/1988 | Sakaida et al. ...................... | 249/103 |
| 5,026,415 | 6/1991 | Yamamoto et al. .................... | 65/305 |
| 5,112,025 | 5/1992 | Nakayama et al. ................... | 249/115 |
| 5,380,349 | * 1/1995 | Taniguchi et al. ..................... | 65/286 |
| 5,427,599 | 6/1995 | Greschner et al. .................... | 65/305 |
| 5,552,098 | * 9/1996 | Kudo et al. ........................... | 264/106 |
| 5,607,705 | * 3/1997 | Asai ..................................... | 425/190 |
| 5,780,119 | * 7/1998 | Dearnaley et al. ................... | 427/528 |
| 5,789,320 | * 8/1998 | Andricacos et al. ................. | 438/678 |
| 5,885,663 | * 3/1999 | Longo .................................. | 427/447 |
| 5,893,998 | * 4/1999 | Kelly et al. .......................... | 249/111 |

FOREIGN PATENT DOCUMENTS

| | | |
|---|---|---|
| 19634974 | 3/1997 | (DE) . |
| 2682689 | 4/1993 | (FR) . |
| 03019154 | 1/1991 | (JP) . |

\* cited by examiner

*Primary Examiner*—Harold Pyon
*Assistant Examiner*—Donald Heckenberg
(74) *Attorney, Agent, or Firm*—Webb Ziesenheim Logsdon Orkin & Hanson, P.C.

(57) ABSTRACT

An injection mould for manufacturing plastic objects generally includes:

two mould parts mutually movable between a closed position and an open position, which mould parts bound in closed position a mould cavity into which in the closed position heated plasticized plastic can be injected by means of supply means, wherein one flat end surface of the mould cavity carries a mechanical pattern, which pattern corresponds with the information for arranging on an information carrier to be manufactured, wherein at least a part of the surfaces is provided with a coating not containing TiN and which reduces a coefficient of friction of the relevant surface to a value which amounts to a maximum of 60% of the value obtainable a coating of TiN;

wherein at least one of the cylindrical inner surface and the cylindrical outer surface is provided with the coating.

18 Claims, 4 Drawing Sheets

INJECTION MOULD

BACKGROUND OF THE INVENTION

1. Field of the Invention

The invention relates to an injection mould, for instance for manufacturing disc-like information carriers or plastic lenses.

2. Description of the Prior Art

In moulds for the production of optical information carriers an insert disc or stamper is arranged in the mould. This stamper carries a mechanical pattern which corresponds with the information for arranging on the information carrier to be manufactured. The stamper is arranged against a hardened steel insert piece, often designated as a mirror, and often held by means of a vacuum. The stamper is manufactured by means of an electro-deposition process and usually consists substantially of nickel. For manufacturing a CD the stamper has a diameter of 138 mm and a thickness of 0.3 mm.

During injection moulding in the mould, heated plastic, generally polycarbonate that is plasticized under high pressure, is injected against the stamper when the mould is closed. The injection pressure of the plastic is locally 1500 bar, wherein the temperature of the plasticized plastic is about 320° C.

The stamper placed in the mould is not wholly flat and will be pressed against the mirror under the influence of the high injection pressure. The hot plastic will also cause the stamper, which normally has a temperature of 60° C., to expand. This combination of pressure and expansion ensures that the stamper slides with micro-movements over the highly polished mirror surface. These micro-movements cause so-called cold weld between the hardened mirror surface and the stamper. Owing to this cold weld a connection occurs wherein the nickel adheres to the steel of the mirror. In practice this results after about 500,000 cycles in a mirror surface which is no longer wholly flat and therefore no longer capable of transferring the information structures from the stamper to the plastic information carrier. The result is deformation of this information, which results in rejection of the information carrier.

A known solution for this problem of pit deformation by cold weld is to provide the mirror surface with a thin coating of several micrometers. This known coating consists of TiN and is arranged by means of "Physical Vapour Deposition" or PVD. In respect of a correct pit formation this coating must be of optical quality without the occurrence of local build-up of so-called droplets (large peaks due to droplet formation). These droplets penetrate into the stamper and cause pit deformation. The result of this known coating is in practice as follows:

Reduction of the cold weld. With the coating about 3,000,000 cycles can be performed with a mirror before pit deformation occurs. This means that the lifespan of the mirror is increased by a factor of 6.

Dirt can be cleaned from the mirror surface more easily.

The mirror surface can be cleaned more easily when nickel is deposited thereon.

A harder and more scratch-resistant surface owing to the use of the coating, so that damage, for instance during cleaning, occurs less quickly, which contributes to a longer lifespan.

Less rejection of manufactured information carriers in that the surface of the mirror is contaminated less rapidly with nickel and pit deformation thereby occurs later.

The TiN coating has resulted in a number of advantages relative to a mirror without coating. There are however still a number of drawbacks which can be mentioned which stand in the way of a higher quality of the manufactured information carrier. Some of these drawbacks are the following:

For applying of the coating a high process temperature is required, i.e. 480° C. This may cause a change in shape due to the residual austenite conversion in the hardened steel of the mirror.

Cold weld is still found to occur despite the fact that a substantial improvement in standing time is realized.

A coefficient of friction of the TiN coating in a lubricant-free situation which is roughly equal to that of steel, i.e. 0.5. It is therefore still not easily possible for the stamper to slide over the mirror surface counter to the pressure of the plastic and possibly counter to the pressure of a resilient venting ring. This causes a certain degree of bulging of the stamper which results in pit deformation, particularly on the outer edge of the information carrier. This phenomenon is further enhanced in the production of a Digital Versatile Disc or DVD, wherein the track pitch is 0.8 micrometer compared to a Compact Disc or CD with a track pitch of 0.6 micrometer.

Attention is focussed in the foregoing on a mould with stamper. Use is however also made of moulds wherein the information for transferring onto the information carrier to be manufactured is arranged directly onto the relevant surface, the mirror. This mirror has an optical polished surface which is very sensitive to scratching which occurs mainly during cleaning. Due to human carelessness the mirror can become unusable due to damage during the first cleaning. During production deposits on this surface which consist of impurities such as dust and dirt and precipitation of for instance additives which evaporate out of the injected plastic. Residual particles of the plastic can become fixed on the outer periphery which result from burr-formation between the moving venting ring and the mirror.

Frictional resistance between the plastic flowing past and the mirror surface causes stress in the produced disc which has an adverse effect on the crystal-clear character of the disc and results in an undesired diffusion of the scanning laser beam during reading of the information on this information carrier.

There is the further phenomenon of cold weld between the mirror and the resilient venting ring shifting therealong. This causes damage both to the mirror and to the venting ring due to deformation of the surface of the slide fitting of both components.

The different mutually movable components of a mould are subject to mutually differing temperatures, which may change in value during successive production cycles. In respect of the necessary very small gap widths, thermal expansion of the different mould parts involved may cause problems. A mould often even has to be designed with undesirably large clearances between diverse components since, in respect of the limited possibilities of temperature control, there is otherwise the danger of a mould jamming. This problem occurs for instance in the case of a for instance resiliently disposed venting ring which is relatively shiftable co-axially and with very slight clearance relative to the mould part around which it is arranged.

This problem generally occurs in the case of a very small gap width in the transition zone between two mould components in the immediate vicinity of the mould cavity.

In respect of the above formulated problems, the invention has for its object to embody an injection mould such that it is essentially free from the described drawbacks.

SUMMARY OF THE INVENTION

In this respect the invention provides an injection mould for manufacturing disc-like information carriers, which mould comprises:

two mould parts mutually movable between a closed and an open position, which mould parts bound in closed position a mould cavity into which in the closed position heated plasticized plastic can be injected by means of supply means, wherein one flat end surface of the mould cavity carries a mechanical pattern either directly or via an insert disc consisting predominantly of nickel, which pattern corresponds with the information for arranging on the information carrier to be manufactured, wherein the one mould part has a cylindrical inner surface partly bounding the mould cavity and the other mould part has a cylindrical outer surface, which cylindrical surfaces can slide over each other, wherein at least one of these surfaces can form part of an optionally resilient venting ring, wherein at least the surfaces bounding the mould cavity and said cylindrical surfaces consist of steel, wherein at least a part of said surfaces is provided with a coating which does not consist of TiN and which reduces the coefficient of friction of the relevant surface to a value which amounts to a maximum of 60% of the value obtainable with a coating of TiN, which coefficient of friction amounts for instance to a maximum of 0.3 with said insert disc consisting predominantly of nickel;

wherein at least said cylindrical inner surface or outer surface is provided with said coating.

The invention thus provides means which have the effect that the sliding contact between the relevant surfaces proceeds substantially more easily in that the relevant coefficient of friction is considerably reduced.

The good and reliable operation of an injection mould can hereby be substantially improved while the gap widths in question can nevertheless be very small.

A preferred embodiment has the special feature that the respective outer surface or inner surface co-acting slidably with said inner surface or outer surface is also provided with said coating.

In order to realize a low-friction contact between the insert disc and the relevant mirror surface and essentially prevent cold weld, the mould according to the invention can have the special feature that the flat end surface of the mould cavity, which carries a mechanical information pattern or against which an insert disc can be placed, is provided with said coating.

It is noted that in the case where the relevant mirror plate is itself provided with a mechanical information pattern, without interposing of a stamper, the coating in question has the function of facilitating flow-past of the plasticized plastic whereby high-grade products can be manufactured in relatively simple manner.

For the same reason the injection mould according to the invention can be embodied such that the flat end surface of the mould cavity lying against said flat end surface is provided with said coating.

In the case a venting ring is used, the mould according to the invention can have the special feature that the flat annular surface located opposite said flat end surface of the mould cavity and forming part of a venting ring is provided with said coating.

A specific embodiment of the injection mould according to the invention has the special feature that the coating consists of a-C:H, being a pure diamond-like carbon material consisting of C and H. Such coatings are per se known as Diamond-Like Carbon or DLC. Coatings of this type have the following advantages within the context of the injection mould according to the invention;

About the same hardness of 2300 HV as the known TiN coating.

A considerably reduced coefficient of friction relative to TiN under lubricant-free conditions, i.e. a maximum of about 0.2 compared to 0.5 for TiN under lubricant-free conditions.

The option of applying the coating in droplet-free manner.

A process temperature during application of a maximum of about 160° C. compared to 480° C. for TiN.

A tribology test was carried out with the described DLC coating. This test consisted of a Ball on Disc test wherein a steel, nickel-coated ball was pressed with a determined pressure onto a rotating, DLC-coated test piece. For comparison purposes the same test was also carried out on the TiN coating. The results of these test were as follows:

The TiN coating showed cold weld between coating and stamper, wherein locally the coating was completely worn away. This was not the case with the DLC coating.

The nickel coating of the nickel-coated ball was completely worn away in the contact with the TiN coating, while this nickel coating remained fully intact when the DLC coating was used.

The result of these tests demonstrate that the drawbacks of the TiN coating will be obviated within the context of the invention by using the DLC coating.

The DLC coating offers the following advantages within the scope of the invention:

Owing to the low coefficient of friction the stamper can expand more easily under the high injection pressure of the plastic and thus essentially prevent pit deformation on the outer edge of the disc.

Cold weld occurs later as a result of the low coefficient of friction. The lifespan of the mirror is hereby increased by a factor of 2, as in the case of the stamper with a lifespan of 40,000 cycles on a mirror with TiN coating and 60,000 cycles on a mirror with DLC coating.

Less rejection of discs. Costs and environment are important aspects here.

No deformation of the mirror owing to the low process temperature when the DLC coating is applied.

Easier to de-coat than TiN owing to the composition of the coating and the low de-coat temperature of a maximum of 160° C.

Easier cleaning of the mirror surface owing to less deposition of both dirt and nickel.

In respect of the mould without stamper the following can be noted. Use can also be made in this case of the described DLC coating. This coating would then in any case have to be applied to the relevant optical polished surface as the fitting diameter across which the venting ring moves. This would offer the following advantages:

More scratch-resistant surface and therefore less immediate damage of this surface. At this moment it is expected that a factor of 2 is attainable.

Little deposition of dirt and precipitation of additives. Cleaning will hereby also become easier.

The so-called scoring or cold weld between the mirror and the resilient venting ring occurs at a much later stage or even not at all. A short-duration test with DLC coating or a venting ring has shown an improvement by a factor of 5.

Owing to the low coefficient of friction of the plastic over the surface provided with a coating the stress level in the disc will be reduced, which results in less diffusion of the scanning laser beam during reading of the disc.

The DLC coating results in a better corrosion resistance of the basic material of the mirror.

Attention is now devoted to the problems relating to the resilient venting ring or de-aerating ring.

This hardened steel venting ring shifts over the mirror periphery with very small clearance. Despite the fact that both parts, the mirror and the venting ring, are manufactured from hardened steel, they both display cold weld and corrosion after about 50,000 cycles. This results in the venting ring jamming. The venting ring must then be disconnected and the high points on the periphery of the mirror and the inner diameter of the venting ring must be removed. In the worst case the mirror and the venting ring are damaged to such an extent that they are no longer useable, because this cold weld leaves marks in the surface.

In addition, the venting ring must be heated by the heated mirror during production with the mould. It has been found that this causes a delaying effect in the heating curve of the venting ring as a result of this indirect heating. The venting ring will now jam when production is started up too soon because the mirror is heated more rapidly and thereby becomes larger more quickly through expansion than the venting ring, the temperature of which lags behind.

It is further found in practice that the venting ring, which is pressed against the stamper under spring pressure, causes pit deformation on the outer periphery of the disc. This is particularly the case with Compact Discs having a longer playing time of for instance 76 min. This phenomenon is caused because during expansion the stamper cannot move easily enough under the venting ring. Decreasing the spring pressure would cause burr-formation on the outer diameter of the disc because the injection pressure of the plastic would press back the venting ring.

It is also possible to envisage the use of DLC coating in respect of the above stated problems. This coating would in any case have to be applied to the inner surface which shifts over the cylindrical outer surface of the mirror surface and the end face which comes in contact with the stamper. The advantages of such a construction are as follows:

Excellent running properties of the venting ring over the periphery of the mirror as a result of the very low coefficient of friction. No cold weld hereby occurs, whereby less wear occurs on mirror and venting ring. An improvement of the standing time by a factor of 10 can be expected at this moment.

Improvement of the corrosion resistance of the basic material of the venting ring.

A greater temperature difference (for instance 20° C. instead of 10° C.) is possible between venting ring and mirror, so it is possible to start sooner. In tests with a venting ring having a DLC coating the described phenomenon of jamming due to delay in heating of the venting ring was found to be considerably reduced. This improvement was the consequence of the low frictional resistance of the DLC coating.

Less deposition of dirt and plastic remnants.

Less pit deformation because the stamper can shift more easily beneath the resilient venting ring.

Alternatively, the mould can be embodied such that the coating consists of a-C:X:H, being a modified carbon material, wherein to the a-C:H material according to claim 2 at least one alloying element X is added, for instance Si, Ge, W, Ti, Ta, Cr, Ni, O, N, B, F.

A preferred embodiment has the special feature that $(2\pm1)\%$ Si is added as alloying element.

In a further embodiment the mould according to the invention has the special feature that the coating comprises a dichalcogenide material with layered crystal structure, which material has the general composition $XY_2$ wherein X is an element from the group to which Mo and W belong and Y is a dichalcogenide such as S, Se, Te. This layer has self-lubricating properties as a result of its layered crystal structure. Despite the layer being relatively soft, it can be successfully applied in the mould according to the invention.

A drawback of the latter described coating is that it has a tendency to degrade under atmospheric conditions (air humidity and oxygen). In this respect the injection mould can have the special feature in an advantageous embodiment that at least one alloying element, such as Ti, F, is added to said material.

Yet another embodiment has the special feature that the coating consists of metal impregnated with PTFE or equivalent compound, for instance Crflor (Cr-PTFE) or Niflor (Ni-PTFE). In this embodiment the metal surface in question is impregnated with PTFE particles during or after application by chemical means. Since, as is well-known, PTFE has anti-adhesive and self-lubricating properties a hard and self-lubricating coating is thus obtained. It can be considered a drawback of such a layer that the PTFE is only present in the top layer and that when the layer is worn away the self-lubricating properties will also tend to diminish gradually.

The invention also relates to a variant, in which the coating is formed by oxidizing or nitro-carbonizing the relevant surface, wherein the connecting zone ($\epsilon$-layer) formed during the thermal treatment is utilized to apply a forced oxidation, wherein a non-porous thin layer of iron oxide is formed. The obtained non-porous thin layer of iron oxide has a good corrosion resistance and a low coefficient of friction.

The described layers can for instance be applied in the ways to be described hereinbelow.

A-C:H, a-C:X:H layers and self-lubricating dichalcogenide layers can be applied in vacuum via PVD techniques (Physical Vapour Deposition) or CVD techniques (Chemical Vapour Deposition), whether or not supported by plasma. Diverse embodiments are possible and described in the literature.

Self-lubricating dichalcogenide layers can also be applied via chemical dispersion techniques, with the associated dichalcogenide powders as starting point.

Metal layers to which PTFE or related materials are added: these can be applied via electrochemical or chemical means, wherein PTFE particles (or other fluorocarbon particles) are added to the chemical bath. PTFE is incorporated or impregnated into the growing layer by mechanical agitation during the deposition process. Another method is to apply the metal layer via electrochemical, chemical means or a PVD technique. Herein is ensured that a metal layer has a sufficient large porosity. After growing of the metal layer it is impregnated with a chemical solution which comprises PTFE particles. These particles become fixed in the pores.

For oxidizing a nitrated or carbo-nitrated substrate the thermal treatment takes place using the known classic techniques in a salt bath or in the gas phase, whether or not supported by plasma. The oxidation takes place by heating the substrate in an oxygen-rich atmosphere.

The invention will now be elucidated with reference to the annexed drawings.

DETAILED DESCRIPTION OF THE PREFERRED EMBODIMENTS

Figure 1:
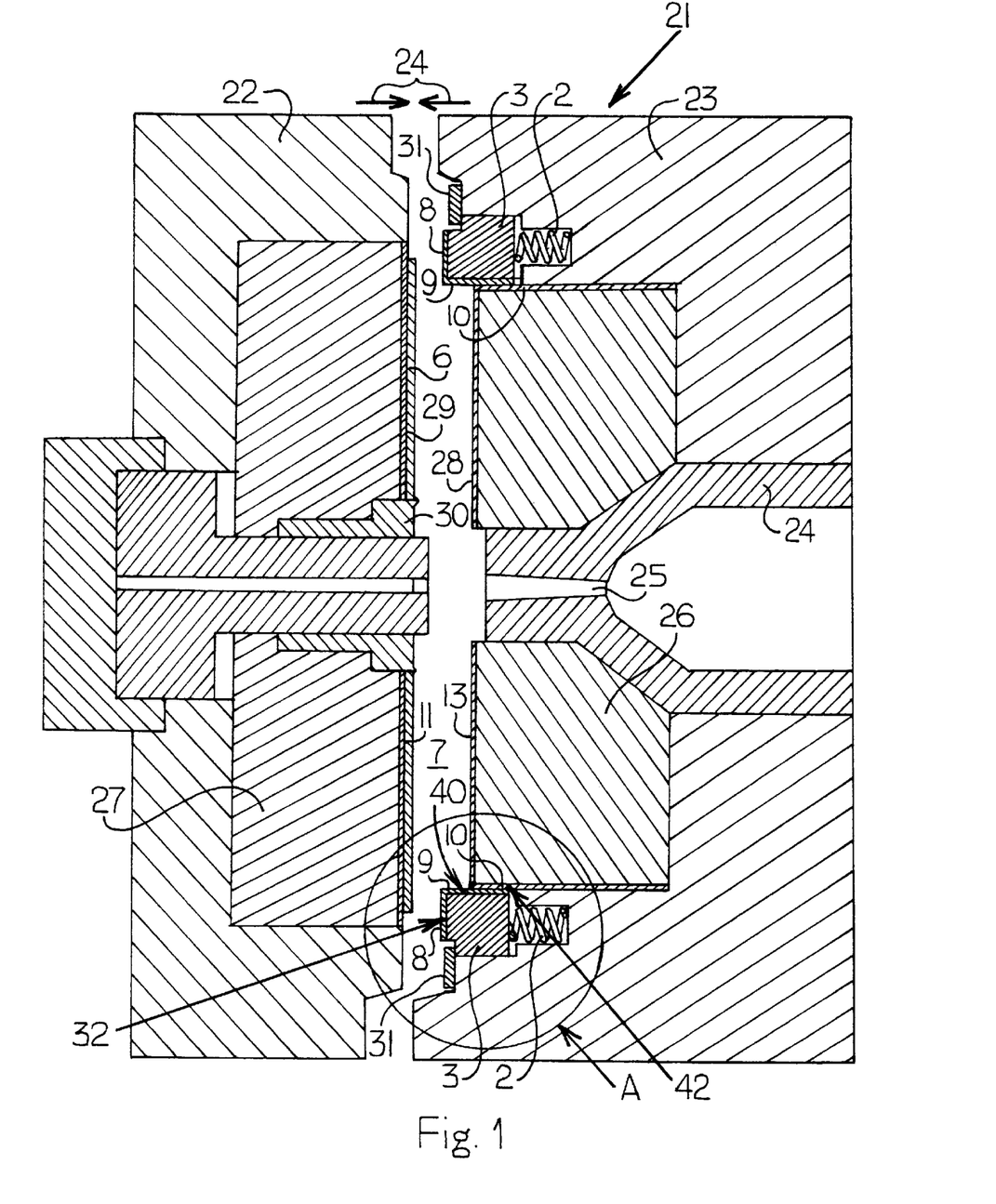
FIG. 1 shows a highly simplified and schematic partial cross-sectional view of an injection mould according to the invention for manufacturing successive disc-like information carriers.

FIG. 1 shows in highly simplified manner an injection mould 21 for manufacturing successive disc-like information carriers. The injection mould 21 includes a first mould part 22 and a second mould part 23.

Figure 2:
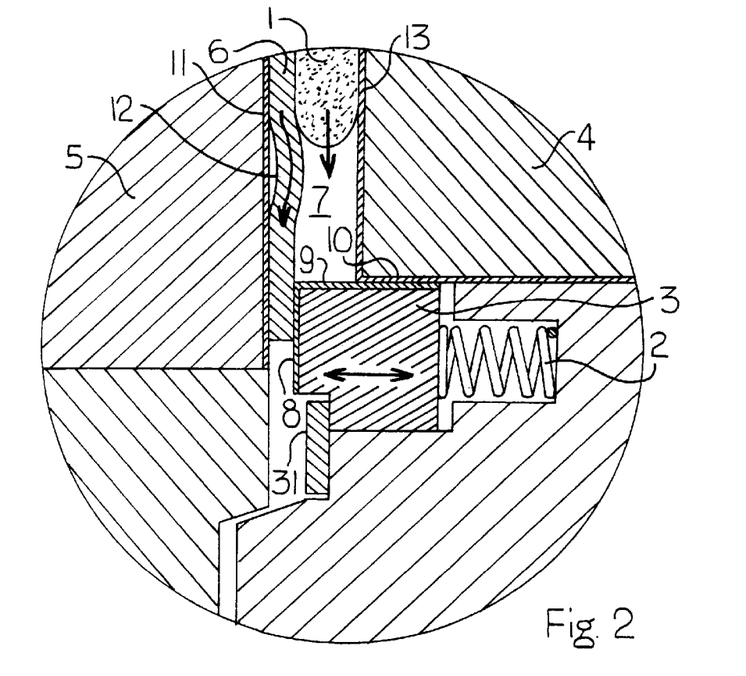
FIG. 2 shows the detail A of FIG. 1 in the situation where the mould is closed and heated plasticized plastic is injected.

The shown mould parts 22 and 23 can be moved toward one another, as designated symbolically with arrows 24, so as to form a disc-like mould cavity 7 which is shown particularly clearly in FIG. 2. Via an injection nozzle 24 heated plasticized plastic can be injected into disc-like mould cavity 7 via an injection channel 25.

Injection mould 21 comprises a first mirror block 26 and a second mirror block 27 which are provided with respective flat, mirror surfaces 28, 29 respectively. For the manufacture of optical information carriers, for instance CD-audio, CD-Rom, DVD, CD-rw and the like, a stamper 6 is placed on mirror surface 29. The stamper 6 is a disc which consists substantially of nickel and on which information is arranged corresponding with the pits to be formed in the information carriers.

The stamper 6 is held against surface 29 by magnetic means, vacuum means (not shown) and/or mechanical holding means 30.

When the mould is closed by moving the mould parts 22, 23 towards each other as according to arrow 24, the periphery of the stamper 6 is pressed against surface 29 by a venting ring 3 spring-loaded by pressure springs 2. A locking ring 31 holds venting ring 3 in position. This is important in respect of the difference to be indicated below between the situation of FIG. 2 and the situation of FIG. 3.

During injection of plastic 1 into mould cavity 7 a shifting force is exerted on stamper 6 which results in stamper 6 expanding thermally and mechanically. This is symbolically designated by the wave-like mechanical deformation of stamper 6, which is indicated with reference numeral 12.

Figure 4:
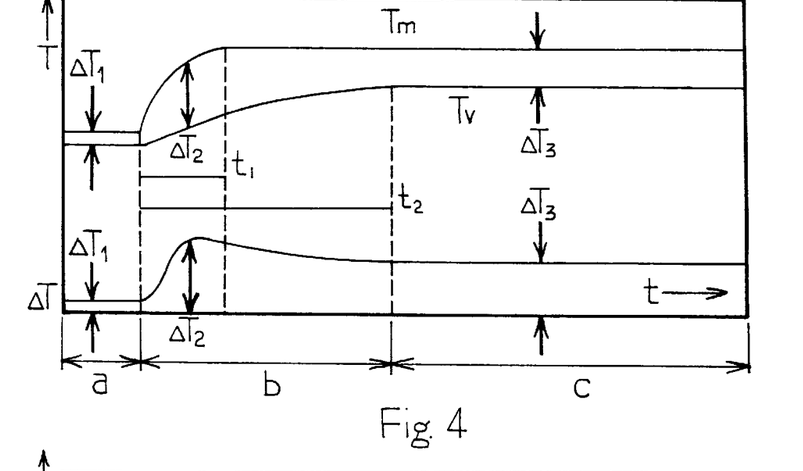
FIG. 4 is a graphic representation of the temperature of the venting ring and the associated mirror as a function of the time during start-up of the injection moulding process.
Figure 5:
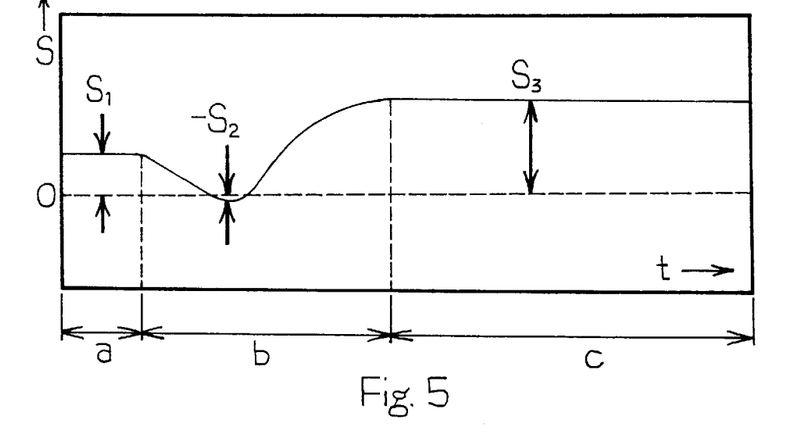
FIG. 5 shows the dimensions of the gap between the venting ring and the associated mirror, for the purpose of elucidating the mechanical limits of the prior art.
Figure 6:
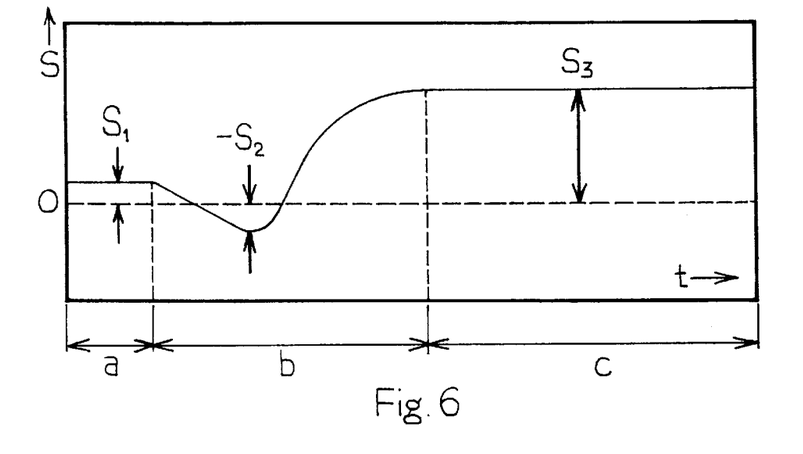
FIG. 6 is a graphic representation corresponding with FIG. 5 of said gap width with use of at least one coating according to the invention.

Essential for a good operation of the mould according to the invention is a very easy mobility of venting ring 3 relative to mirror block 26. For this purpose the invention provides a substantial decrease in friction during the sliding contact between these. These provisions comprise in this embodiment a specific coating 9 on the cylindrical inner surface 40 of venting ring 3 as well as a similar or identical coating 10 on the cylindrical outer surface 42 of mirror block 26. It is noted that in principle one of the two coatings could suffice. With reference to FIGS. 4, 5 and 6 an explanation will be given hereinbelow of the important consequence the arranging of coating 9 and/or 10 has.

A coating 8 is also arranged on the annular front surface 32 of venting ring 3. In the situation shown in FIG. 2 this provides for an easy sliding displacement of stamper 6. In the same context a coating 11 is applied to mirror surface 29.

Mirror surface 28 is also provided with a coating which is designated with reference numeral 13. This has a non-mechanical function but serves to ensure that in the situation shown in FIG. 2 the plastic can pass very easily and without deposition along the surface in question.

Figure 3:
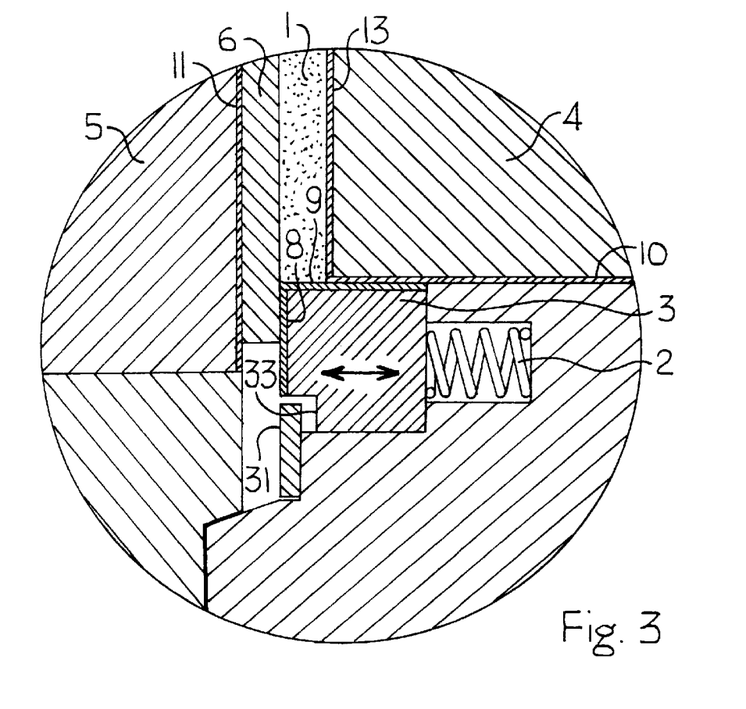
FIG. 3 shows a view corresponding with FIG. 2 of the mould in the situation in which injection of plastic is completed.

In the situation shown in FIG. 3 the mould cavity 7 is completely filled with plastic and mirror blocks 4 and 5 are subsequently pushed some distance toward each other. This is manifested in a space between locking ring 31 and the relevant annular shoulder surface 33 of venting ring 3. This after-pressure ensures a still more improved quality of the information carrier in question, whereby all information present on stamper 6 is transferred with very great fidelity into the still fluid polycarbonate mass. After sufficient cooling and thus curing of this polycarbonate mass, the semi-manufacture is in principle finished and can be taken out of the first opened mould.

FIG. 4 shows the temperature T of the venting ring and the mirror as a function of the time t in respectively the heating phase a, the start-up phase b and the production phase c. The temperature of the venting ring is designated $T_v$, while the temperature of the mirror is designated $T_m$. The problem which occurs here is that the material of the venting ring has a relatively low thermal conduction coefficient. Other values shown represented in FIG. 4 are designated as follows:

$\Delta T1$=the temperature difference between the mirror and the venting ring after a minimum of 10 minutes of heating during heating phase a.

$\Delta T2$=the maximum temperature difference between the mirror and the venting ring during start-up phase b.

$\Delta T3$=the temperature difference between the mirror and the venting ring during production phase c.

t1=the time required by the mirror from the moment of start-up to reach its final temperature.

t2=the time required by the venting ring from the moment of start-up to reach its final temperature.

FIG. 4 shows that during start-up phase b the temperature difference=$\Delta T2$=Tm−Tv reaches its maximum value.

FIGS. 5 and 6 show graphically the gap width between venting ring 3 and mirror block 4 in respectively the prior art and the invention.

According to the prior art no friction-reducing coating is used, as indicated in the figures with 9 and/or 10. In the situation corresponding with $\Delta T2$, in which the temperature difference between venting ring and mirror block 4 is maximal, the gap width S, which has the value $S_1$ in the heating phase, can fall to a value below zero. In this manner the venting ring comes to lie clamped around mirror block 4. Depending on the degree of clamping it may or may not still be possible to release this clamping by exerting sufficient force. Jamming occurs in practice at a value of $-S_2$ in the order of 1 μm. This is the situation shown in FIG. 5. In the production phase the gap width increases to the value $S_3$.

According to the invention use is made of a friction-reducing coating 9 and/or 10. As a result the negative value of the gap width can be substantially larger than the value $-S_2=1$ μm.

FIG. 6 indicates that the value $-S_2$ can be substantially larger with use of one or two coatings, i.e. to about $-S_2=7$ μm. Since the difference between $S_1$ and $S_2$ is not influenced by the presence of a coating, the temperature progression as according to FIG. 4 applies for both FIG. 5 and FIG. 6. This means that the gap width during the start-up phase, which is indicated again in FIG. 6 with $S_1$, can in this case be substantially smaller than in the case according to FIG. 5. The same applies for the value of $S_3$ which, in the case of the mould according to the invention of FIG. 6, can be smaller than $S_3$ of the prior art as according to FIG. 5.

Attention is drawn to the fact that the presence of coating 9 and/or 10 must be deemed essential according to the invention. The other coatings can contribute toward a still further improvement of the mould but are deemed somewhat less essential at the time of drafting of this patent application.

Figure 7:
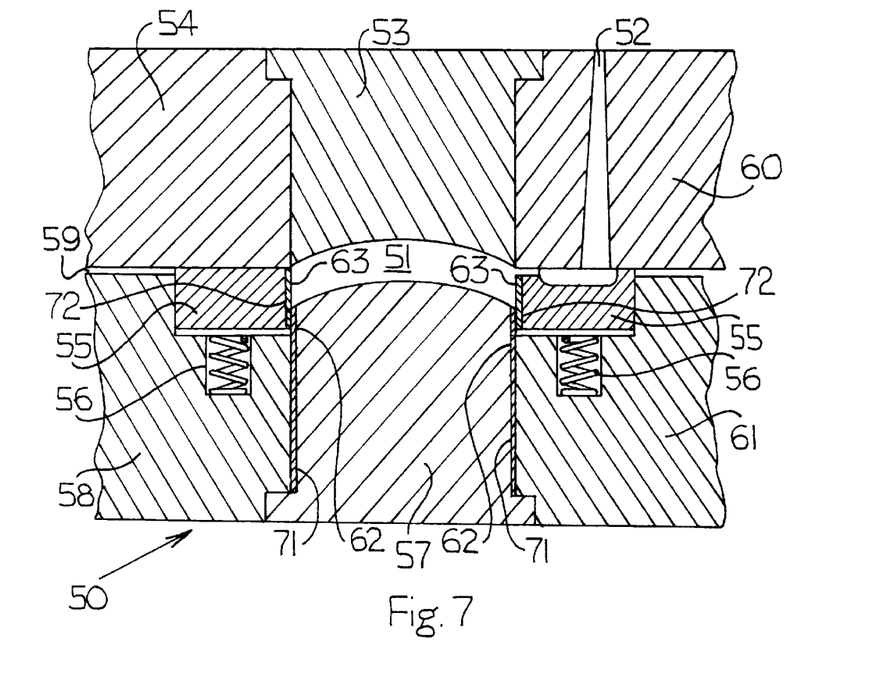
FIG. 7 shows a cross-section through an injection mould for manufacturing a plastic lens in the situation in which plastic is injected.
Figure 8:
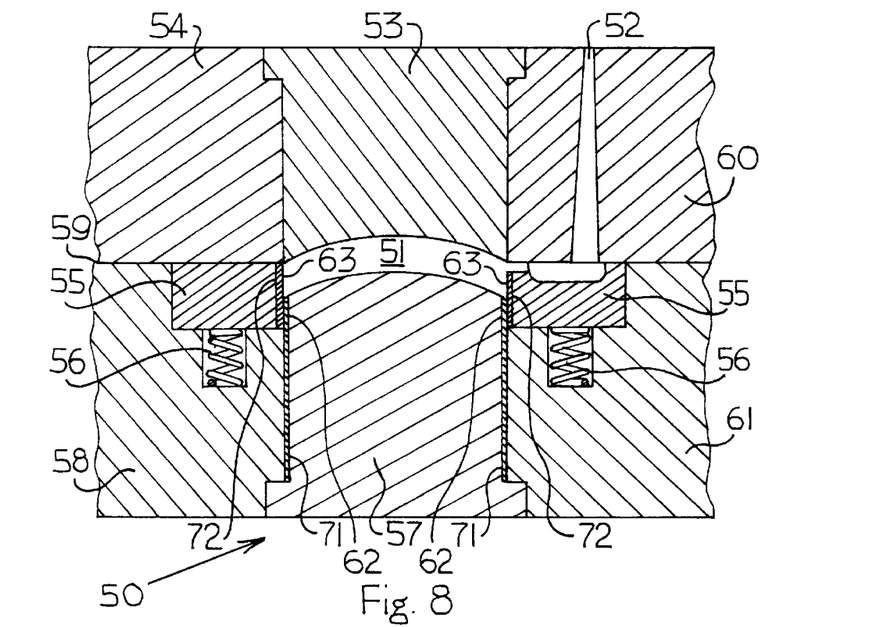
FIG. 8 shows a cross-sectional view corresponding with FIG. 7 of a situation in which the mould is completely filled with plastic and the injection moulding machine has fully closed the mould.

FIGS. 7 and 8 show an injection mould 50 for manufacturing a plastic lens.

The reference numerals refer to the diverse components as according to the list below:
- 51 mould cavity
- 52 conical injection channel
- 53 front mould mirror block
- 54 front plate
- 55 movable de-aerating or venting ring
- 56 pressure springs (can also be replaced by other suitable provisions) which ensure that the venting ring is pressed in the direction of front plate 54.
- 57 rear mould mirror block
- 58 rear plate
- 59 opening between front mould part or front plate 54 and rear plate or rear mould part 58 (in the situation of FIG. 8 the opening or gap 59 is reduced virtually to zero in this embodiment).
- 60 front mould
- 61 rear mould
- 62 surface of the rear mirror which is provided with for instance a DLC coating 71 to reduce the coefficient of friction with venting ring 55.
- 63 surface of the venting ring provided with a coating 72 which consists for instance of DLC and which co-acts slidingly with coating 71.

What is claimed is:

1. An injection mould for manufacturing disc-shaped plastic objects, which mould comprises:

a first mould part and a second mould part, with the mould parts mutually movable between a closed position and an open position of the injection mould, and with the mould parts defining in the closed position of the injection mould a mould cavity into which in the closed position of the injection mould heated plasticized plastic is injectable by supply means, wherein the mould parts each include a mirror block with a flat mirror surface, with the mirror block of the first mould part having a mechanical pattern on the flat mirror surface thereof, which pattern corresponds with information for imparting onto the objects to be manufactured, wherein the second mould part includes a venting ring having a cylindrical inner surface partly bounding the mould cavity, wherein the mirror block of the second mould part has a cylindrical outer surface, wherein the venting ring and the mirror block of the second mould part are positioned such that the cylindrical inner surface of the venting ring and the cylindrical outer surface of the mirror block of the second mould part are slideable over each other, wherein the venting ring, the flat mirror surfaces and the mirror blocks are made of steel, wherein at least one of the cylindrical inner surface of the venting ring and the cylindrical outer surface of the mirror block of the second mould part is provided with a coating which does not include TiN and which reduces a coefficient of friction between the cylindrical inner surface of the venting ring and the cylindrical outer surface of the mirror block of the second mould part to a value of about 60% of the value obtainable with a TiN coating.

2. The injection mould as claimed in claim 1, wherein the cylindrical outer surface of the mirror block of the second mould part and the cylindrical inner surface of the venting ring are provided with the coating.

3. The injection mould as claimed in claim 1, wherein the flat mirror surface of the mirror block of the first mould part is provided with the coating.

4. The injection mould as claimed in claim 3, wherein the flat mirror surface of the mirror block of the second mould part is provided with the coating.

5. The injection mould as claimed in claim 3, wherein the venting ring includes a flat annular surface facing the flat mirror surface of the mirror block of the first mould part and is provided with the coating.

6. The injection mould as claimed in claim 1, wherein the coating consisting of C:H, with the coating being a diamond-like carbon material consisting of C and H.

7. The injection mould as claimed in claim 1, wherein the coating consisting of C:X:H, with the coating being a modified carbon material, wherein to C:X:H material at least one alloying element X is added, and wherein the alloying element X is selected from the group consisting of Si, Ge, W, Ti, Ta, Cr, Ni, O, N, B and F.

8. The injection mould as claimed in claim 7, wherein 2±1% Si is added as the alloying element X.

9. The injection mould as claimed in claim 1, wherein the coating includes a dichalcogenide material with layered crystal structure, which material has a composition of $XY_2$, wherein X is an element selected from the group consisting of Mo and W, and wherein Y is a dichalcogenide selected from the group consisting of S, Se and Te.

10. The injection mould as claimed in claim 9, wherein at least one alloying element selected from the group consisting of Ti and F is added to the material.

11. The injection mould as claimed in claim 1, wherein the coating is selected from the group consisting of metal impregnated with PTFE, Cr-PTFE and Ni-PTFE.

12. The injection mould as claimed in claim 1, wherein the coating is formed by one of oxidizing and nitro-carbonizing the relevant surface, and wherein a connecting zone formed during thermal treatment is utilized to apply a forced oxidation, and wherein a non-porous thin layer of iron oxide is formed.

13. The injection mould as claimed in claim 1, wherein the objects to be manufactured include disc information carriers.

14. The injection mould as claimed in claim 1, further including an insert disc held against the flat mirror surface of the mirror block of the first mould part by holding means, and wherein the mechanical pattern is formed on the insert disc.

15. The injection mould as claimed in claim 1, wherein the venting ring is resiliently connected to the mirror block of the second mould part by at least one pressure spring.

16. The injection mould as claimed in claim 2, wherein the coating consisting of C:X:H, with the coating being a modified carbon material, wherein to C:X:H material at least one alloying element X is added, and wherein the alloying element X is selected from the group consisting of Si, Ge, W, Ti, Ta, Cr, Ni, O, N, B and F.

17. The injection mould as claimed in claim 14, wherein the insert disc is made predominately of nickel.

18. The injection mould as claimed in claim 14, wherein the holding means includes one of magnetic means, vacuum means and mechanical means.

* * * * *

UNITED STATES PATENT AND TRADEMARK OFFICE
CERTIFICATE OF CORRECTION

PATENT NO.    : 6,238,197 B1                                         Page 1 of 1
DATED         : May 29, 2001
INVENTOR(S)   : Petrus J.F.J. Van Hout et al.

It is certified that error appears in the above-identified patent and that said Letters Patent is hereby corrected as shown below:

Title page,
Item [57], ABSTRACT, line 16, after "obtainable" insert -- with --.

Column 2,
Line 32, after "production deposits" insert -- form --.

Column 8,
Line 7, after "between these" insert -- components --.
Line 58, after "difference" delete equal sign (=).

Signed and Sealed this

Nineteenth Day of February, 2002

Attest:

JAMES E. ROGAN
Attesting Officer      Director of the United States Patent and Trademark Office